US008321521B1

(12) United States Patent
Raciborski et al.

(10) Patent No.: US 8,321,521 B1
(45) Date of Patent: Nov. 27, 2012

(54) WRITE-COST OPTIMIZATION OF CDN STORAGE ARCHITECTURE

(75) Inventors: Nathan F. Raciborski, Jackson, WY (US); Bradley B. Harvell, Gilbert, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 11 days.

(21) Appl. No.: 13/316,289

(22) Filed: Dec. 9, 2011

Related U.S. Application Data

(63) Continuation of application No. PCT/US2011/041913, filed on Jun. 24, 2011.

(51) Int. Cl.
*G06F 15/167* (2006.01)
(52) U.S. Cl. .................. 709/213; 711/118; 711/114
(58) Field of Classification Search .................. 709/213; 711/118, 114
See application file for complete search history.

(56) References Cited

U.S. PATENT DOCUMENTS

| | | | |
|---|---|---|---|
| 5,535,399 A | 7/1996 | Blitz et al. | |
| 8,032,700 B2 | 10/2011 | Bruce et al. | |
| 2005/0010620 A1* | 1/2005 | Silvers et al. | 707/205 |
| 2007/0192798 A1 | 8/2007 | Morgan | |
| 2008/0195648 A1* | 8/2008 | Matsumoto | 707/102 |
| 2009/0089343 A1* | 4/2009 | Moore et al. | 707/205 |
| 2009/0235038 A1* | 9/2009 | Sartore | 711/162 |
| 2010/0082879 A1 | 4/2010 | Mckean et al. | |
| 2010/0082936 A1 | 4/2010 | Hobbet et al. | |
| 2010/0131671 A1 | 5/2010 | Kohli et al. | |
| 2010/0199036 A1 | 8/2010 | Siewert et al. | |
| 2010/0262633 A1 | 10/2010 | Bhattacharjee et al. | |
| 2010/0262683 A1* | 10/2010 | Gerber et al. | 709/223 |
| 2011/0035548 A1* | 2/2011 | Kimmel et al. | 711/114 |
| 2011/0276623 A1* | 11/2011 | Girbal | 709/203 |

OTHER PUBLICATIONS

Wikipedia, "Hybrid drive," Retrieved on Jun. 17, 2011 from http://en.wikipedia.org/wiki/Hybrid_drive, 2011, 6 pages.
Wikipedia, "OSI model," Retrieved on Jun. 17, 2011 from http://en.wikipedia.org/wiki/OSI_model, 2011, 6 pages.
International Search Report and Written Opinion of PCT/US2011/041913 mailed on Feb. 29, 2012, 8 pages.
"Seagate Momentus XT 500GB Solid State Hybrid Drive Review", Retrieved on Mar. 12, 2012 from http://www.legitreviews.com/article/1310/1/, 2010, p. 1-4.

* cited by examiner

*Primary Examiner* — Jungwon Chang
(74) *Attorney, Agent, or Firm* — Kilpatrick Townsend & Stockton, LLP

(57) ABSTRACT

A method and system for cache optimization in a hybrid solid state drive and magnetic storage cache architecture for a content delivery network (CDN) is disclosed. The CDN has a number of geographically distributed points of presence (POPs) across the Internet. Customers of the CDN pay for storage of content objects. Cache management in a POP analyzes information related to content objects to determine if storage will be on a solid state drive (SSD) instead of a magnetic drive. The information used in this analysis is from the application layer or above in the open systems interconnection (OSI) model. The content objects are delivered from either the SSD or magnetic storage to end users.

20 Claims, 11 Drawing Sheets

WRITE-COST OPTIMIZATION OF CDN STORAGE ARCHITECTURE

CROSS-REFERENCES TO RELATED APPLICATIONS

This application is a bypass continuation of PCT/US2011/041913, filed Jun. 24, 2011, which is incorporated by reference in its entirety for all purposes.

BACKGROUND

This disclosure relates in general to cache architecture and, but not by way of limitation, to cache architecture utilizing solid state drives (SSDs).

Content delivery networks (CDNs) are in the business of delivering content for others. CDNs will either cache and/or host content for its customers. Efficiently delivering content for a large number of customers creates difficulty. It would not be practical to store every possible content object serviced by the CDN on every edge server. Often caches are used on the edge servers to store popular or important content at the edges of the CDN. Popular content is less likely to have delivery latency, while less popular content is more likely to take a longer time to locate and deliver.

CDNs are optimized for affordable delivery and hosting of content and processing at varying quality of service (QoS). Through a distributed network of points of presence (POPs), there is likely to be a POP close to any end user. Caching and storage servers at the edge ("edge servers") of the CDN and in each POP are optimized to deliver content for the customers who purchase service from the CDN. The storage needs in edge servers are ever increasing as the number of customers increases along with the size and volume of content objects.

SSDs have very fast seek times in comparison to spinning disks. This advantage comes with serious disadvantages that plague SSDs. Specifically, they are around ten times more expensive per byte than spinning media. Additionally, the underlying storage cells are EEPROM or flash which degrades over time as more writes occur. Caches are constantly adding and removing content such that the lifetime of a SSD would be unacceptable where reliability is important. These disadvantages have precluded adoption of SSD by CDNs.

SSD manufactures try to solve the limitation on writing to SSDs through several techniques. There is wear leveling which tries to distribute the writes evenly across the flash. Additionally, there is spare flash that is used to replace worn out cells. As cells go bad, replacement cells are seamlessly substituted so that the SSD appears to be without defect. The higher the stated reliability, the more spare flash is reserved. Additionally, error correction codes are used to mask bad cells. Error correction bits reduce the amount of information that can be stored on the SSD. Conventional solutions address less write-intensive activity than CDN caching.

SUMMARY

In one embodiment, the present disclosure provides a method and system for cache optimization in a hybrid solid state drive and magnetic storage cache architecture for a content delivery network (CDN). The CDN has a number of geographically distributed points of presence (POPs) across the Internet. Customers of the CDN pay for storage of content objects. Cache management in a POP analyzes information related to content objects to determine if storage will be on a solid state drive (SSD) instead of a magnetic drive. The information used in this analysis is from the application layer or above in the open systems interconnection (OSI) model. The content objects are delivered from either the SSD or magnetic storage to end users.

In another embodiment, the present disclosure provides a method for cache optimization in a hybrid solid state drive and spinning drive cache architecture. A content object is received at a content delivery network (CDN) from a customer for storage. The CDN has a plurality of points of presence (POPs) geographically distributed across the Internet; Information related to the content object is analyzed to determine if storage at one POP of the plurality of POPs will be on a solid state drive (SSD). The information is from the application layer or above in the open systems interconnection (OSI) model. The content object is stored on the SSD. A request for the content object is received from an end user at the one POP and the request corresponds to an universal resource identifier (URI). If content object is determined to be stored on the SSD rather than a magnetic drive, the content object is retrieved from the SSD and delivered to the end user.

In yet another embodiment, the present disclosure provides an edge server of a content delivery network (CDN) having a plurality of points of presence (POPs) geographically distributed across the Internet. The edge server includes a solid state drive (SSD) that stores a content object, a magnetic drive that does not store the content object and a network interface. The network interface receives a request for the content object from an end user. The request corresponds to an universal resource identifier (URI). The network interface returns the content object from the SSD to the end user. The edge server includes a cache manager operating in the application layer or above in the open systems interconnection (OSI) model. The cache manager loads information related to the content object that is stored by the CDN for a customer and analyzes the information to designate the SSD for storage of the content object.

In still another embodiment, one or more machine-readable medium having machine-executable instructions configured to perform the machine-implementable method for cache optimization in a hybrid solid state drive and spinning drive cache architecture. The one or more machine-readable medium comprising code for: receiving a content object at a content delivery network (CDN) from a customer for storage, the CDN having a plurality of points of presence (POPs) geographically distributed across the Internet; analyzing information related to the content object to determine if storage at one POP of the plurality of POPs will be on a solid state drive (SSD), where the information is from the application layer or above in the open systems interconnection (OSI) model; storing the content object on the SSD; receiving a request for the content object from an end user at the one POP, where the request corresponds to an universal resource identifier (URI); determining that the content object is stored on the SSD rather than a magnetic drive; retrieving the content object from the SSD; and delivering the content object to the end user.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
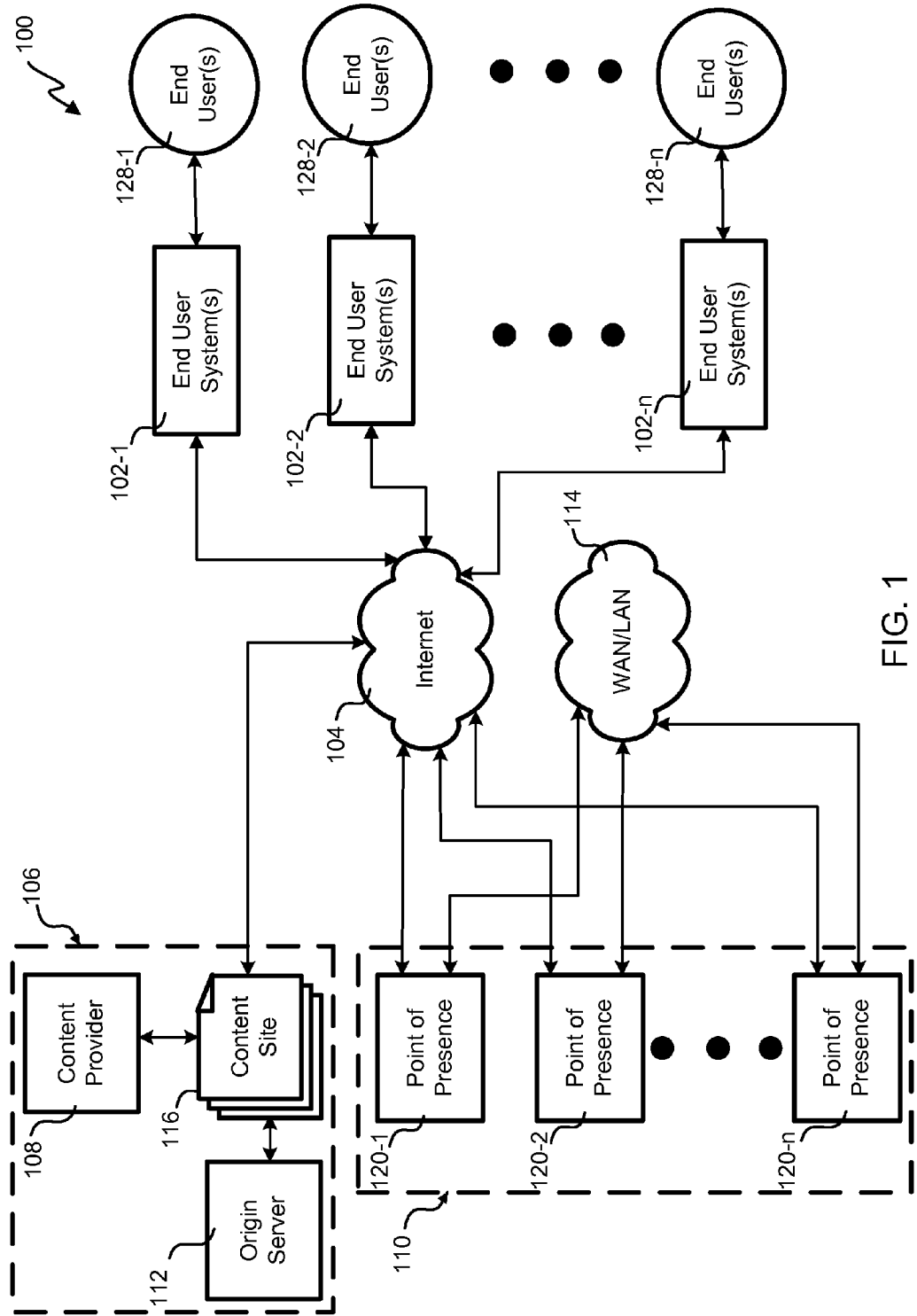
FIG. 1 depicts a block diagram of an embodiment of a content distribution system.

Referring first to FIG. 1, a block diagram of an embodiment of a content distribution system 100 is shown. The content originator 106 offloads delivery of the content objects to a content delivery network (CDN) 110 in this embodiment. The content originator 106 produces and/or distributes content objects and includes a content provider 108, a content site 116, and an origin server 112. The CDN 110 can both cache and/or host content in various embodiments for third parties to offload delivery and typically provide better quality of service (QoS) to a broad spectrum of end user systems 102 distributed worldwide. The content originator 106 is the customer of the CDN 110 and an end user 128 benefits from improvements in QoS.

In this embodiment, the content distribution system 100 locates the content objects (or portions thereof) and distributes the content objects to an end user system 102. The content objects are dynamically cached within the CDN 110 and/or hosted by the CDN 110. A content object is any content file, content stream or a range defining a segment of a content file or content stream and could include, for example, video, pictures, data, audio, software, and/or text. The content object could be live, delayed or stored. The range defining a segment could be defined as a byte range or time range within the playback. Throughout the specification, references may be made to a content object, content, content stream and/or content file, but it is to be understood that those terms could be used interchangeably wherever they may appear.

Many content providers 108 use a CDN 110 (or multiple CDNs) to deliver the content objects over the Internet 104 to end users 128. The CDN 110 includes a number of points of presence (POPs) 120, which are geographically distributed through the content distribution system 100 to deliver content with lower latency. Various embodiments may have any number of POPs 120 within the CDN 110 that are generally distributed in various locations around the Internet 104 so as to be proximate to end user systems 102. Multiple POPs 120 use the same IP address such that an Anycast routing scheme is used to find a POP likely to be close to the end user, in a network sense, for each request. In addition to the Internet 104, a wide area network (WAN) and/or local area network (LAN) 114 or other backbone may couple the POPs 120 with each other and also couple the POPs 120 with other parts of the CDN 110. Distributed storage, processing and caching is provided by the CDN 110.

When an end user 128 requests a web page (or other content) through its respective end user system 102, the request for the web page is passed either directly or indirectly via the Internet 104 to the content originator 106. The content originator 106 is the source or re-distributor of content objects, i.e., the so-called origin server 112. The content site 116 is an Internet web site accessible by the end user system 102. In one embodiment, the content site 116 could be a web site where the content is viewable with a web browser. In other embodiments, the content site 116 could be accessible with application software other than a web browser. The content provider 108 directs content requests to a CDN 110 after they are made or formulates the delivery path by embedding the delivery path into the universal resource indicators (URIs) for a web page. In any event, the request for content is handed over to the CDN 110 in this embodiment by using an Anycast IP address corresponding to two or more POPs 120. In some embodiments, the CDN 110 hosts content objects and/or web pages to be the origin server.

Once the request for a content object is passed to the CDN 110, the request is associated with a particular POP 120 within the CDN 110 using the Anycast routing scheme, but other embodiments could use routing, redirection or DNS to shunt requests to a particular POP 120. It is noted that the CDN 110 processes requests for content in the application layer of the open systems interconnection (OSI) model with URIs, URLs and HTTP. The particular POP 120 may retrieve the portion of the content object from the content provider 108 where it is acting as the origin server. Alternatively, the content provider 108 may directly provide the content object to the CDN 110 and its associated POPs 120 through pre-population of caches (i.e., in advance of the first request) or hosting. A storage policy could be defined to specify the conditions under which pre-population is performed. In this embodiment, the content objects are provided to the CDN 110 and stored in one or more CDN servers such that the portion of the requested content may be hosted from the CDN 110. The CDN servers include edge servers in each POP 120 that actually serve end user requests. The origin server 112 holds a copy of each content object for the content originator 106. Periodically, the content of the origin server 112 may be reconciled with the CDN 110 through a caching, hosting and/or pre-population algorithm, for example, through a storage policy. Some content providers could use an origin server within the CDN 110 to host the content and avoid the need to maintain a copy.

Once the content object is retrieved, the content object is stored within the particular POP 120 and is served from that POP to the end user system 102. The end user system 102 receives the content object and processes it for use by the end user 128. The end user system 102 could be a personal computer, media player, handheld computer, tablet, pad, Internet appliance, phone, smart phone, IPTV set top, streaming radio or any other device that receives and plays content objects. In some embodiments, a number of the end user systems 102 could be networked together. Although this embodiment only shows a single content originator 106 and a single CDN 110, it is to be understood that there could be many of each in various embodiments.

Figure 2:
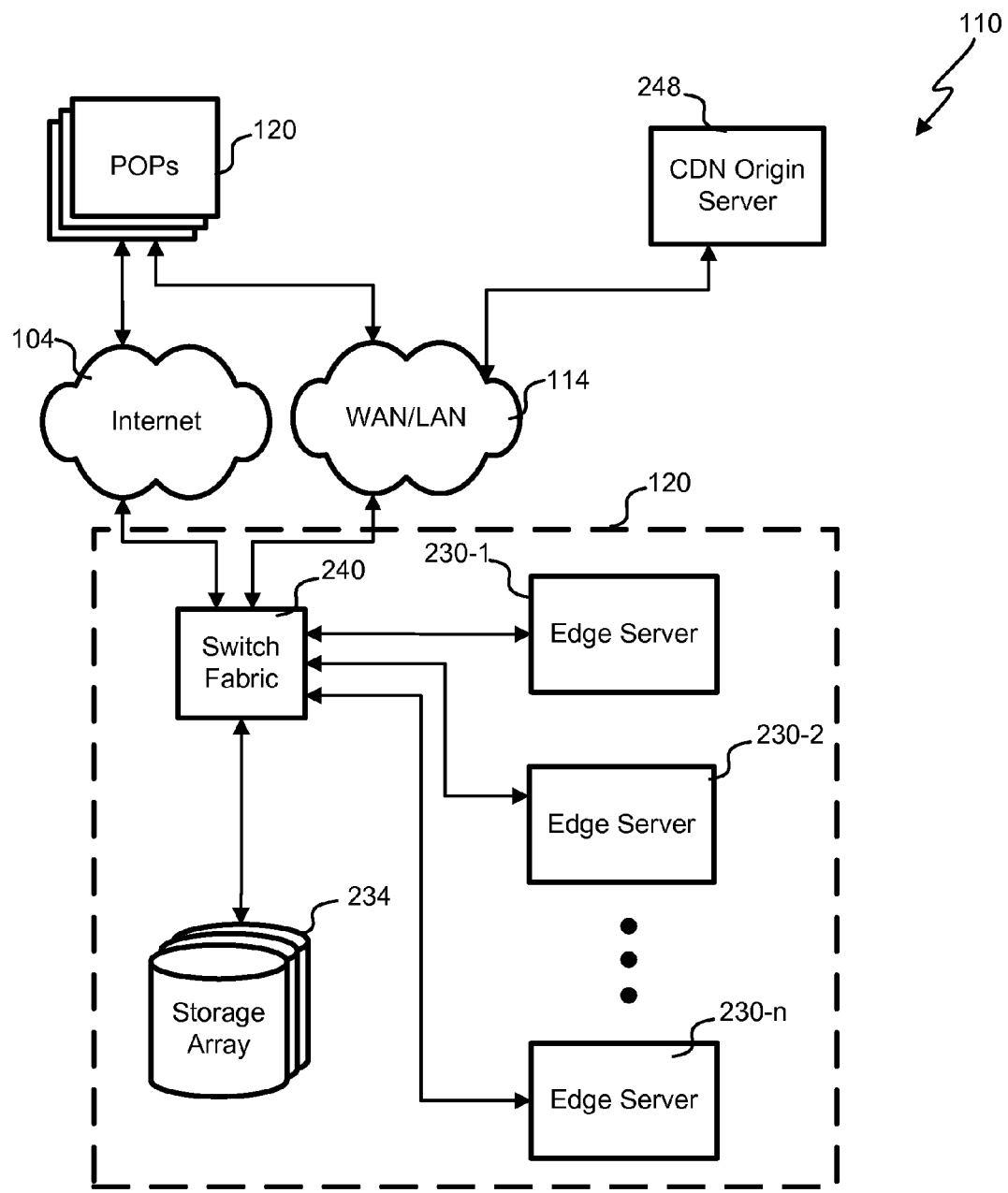
FIG. 2 depicts a block diagram of an embodiment of a content delivery network (CDN)

With reference to FIG. 2, a block diagram of an embodiment of a CDN 110 is shown. Although only one POP 120 is shown in detail, there are a number of POPs 120 similarly configured throughout the CDN 110. The POPs 120 communicate through a WAN/LAN 114 and/or the Internet 104 when locating content objects. An interface from the Internet 104 to the POP 120 accepts requests for content objects from end user systems 102. The requests come from an Internet protocol (IP) address of the end user device 128 in the form of a URI that causes a HTTP get command. The requests for content files from the CDN 110 pass through the application layer.

Switch fabric 240 assigns the request to one of the edge servers 230 according to a routing scheme such as round robin, load balancing, etc. In this embodiment, the switch fabric 240 is aware of which edge servers 230 have what capabilities and assigns requests within the group having the capability to store and serve the particular content object referenced in the URI. A protocol such as cache array routing protocol (CARP) is used in this embodiment to disperse the URIs between the group of edge servers 230 to spread out loading. Every time that a particular URI is requested from the group, it is assigned to the same edge server 230 using CARP. The edge servers 230 gathered in a particular group as neighbors can be the other servers in the current POP 120, less loaded servers in the current POP 120, servers having the capability to process the content object, a subset of servers assigned to a customer using the CDN to serve the content object, or some other grouping of servers in the POP 120.

In another embodiment, the switch fabric 240 assigns the request to one of the edge servers 230, which performs CARP to either service the request itself or reassign it to a neighboring edge server 230. The switch fabric 240 sends each packet flow or request to an edge server 230 listed in the configuration of the switch fabric 240. This embodiment does not have awareness of the particular capabilities of any edge server 230. The assignment can be performed by choosing the edge server 230 with the least amount of connections or the fastest response time, but the switch fabric 240 in this embodiment assigns the packet flow somewhat arbitrarily using round robin or random methodologies. When the chosen edge server 230 receives the packet flow, an algorithm like CARP is used by the chosen edge server 230 to potentially reassign the packet flow between a group of edge servers 230 to the one edge server 230 dictated by the algorithm. For example, the switch fabric 240 could choose a second edge server 230-2 being the next in the round robin rotation. The second edge server 230-2 would perform CARP on the request and find that the first edge server 230-1 is being assigned this type of request. The request would be reassigned to the first edge server 230-1 to be fulfilled.

In some cases, the CDN 110 is used to host content for others. Content providers 108 upload content to a CDN origin server 248. Although only one CDN origin server 248 is shown, it is to be understood that there could be many spread among a number of locations and/or POPs 120. The content object can be stored in the CDN origin server 248. The CDN origin server 248 serves the content object within the CDN 110 to various edge servers 230 in various POPs 120. After the content provider 108 places a content object on the CDN origin server 248 it need not be hosted on the origin server 112 redundantly. Although shown separately, it is to be understood that the CDN origin sever 248 could be integral to an edge server 230.

Some embodiments include an optional storage array 234 in the POP 120 or elsewhere in the CDN 110. The storage array 234 can provide hosting, storage and/or caching. Edge servers 230 can revert to the storage array 234 for certain content, for example, very large files or infrequently requested files. Flushing of a cache of an edge server 230 could move the content to the storage array 234 until it is ultimately flushed from the storage array 234 after which subsequent requests would be fulfilled by an origin server 112 to repopulate cache in the POP 110.

Requests from end user systems 102 are assigned to an edge server 230 that may cache, store or host the requested content object. On occasion, the edge server 230 receiving a request does not have the content object stored for immediate serving. This so-called "cache miss" triggers a process within the CDN 110 to effectively find the content object (or portion thereof) while providing adequate QoS. The content may be found in neighboring edge servers 230 in the same POP 120, in another POP 120, in a CDN origin server 248, in a POP storage array 234, or even an external origin server 112. The various edge and origin servers 230, 248 are grouped for various URIs uniquely. In other words, one URI may look to one group of servers 230, 248 on a cache miss while another URI will look to a different group of servers 230, 248.

One embodiment uses a policy-based storage scheme. Customers of the CDN 110 can specify a policy that allows great flexibility in how their data is stored and cached. The policy can specify SSD or spinning media, edge caching or storage array caching, and under what circumstances to store or cache in the various options. For example, a customer may specify a policy that will enforce a class of storage that exclusively uses SSD for caching and/or hosting because of the reduced carbon footprint or speed.

Figure 3:
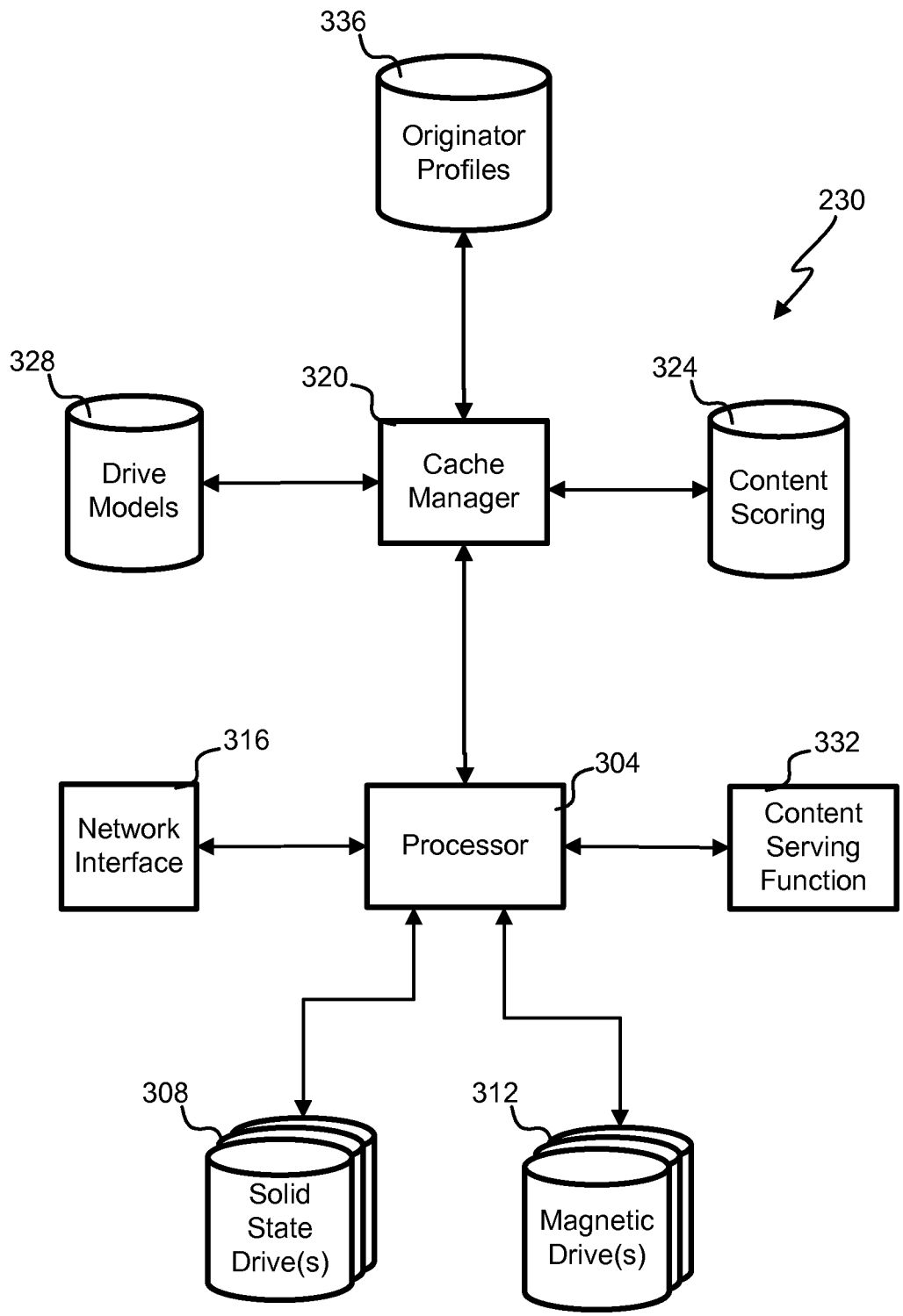
FIG. 3 depicts a block diagram of an embodiment of an edge server.

Referring next to FIG. 3, a block diagram of an embodiment of an edge server 230 is shown. The edge server 230 in this embodiment includes both a magnetic drive(s) 312 and a SSD(s) 308. Where there are multiple drives 308, 312, they can be arranged in a RAID array or a RAID array of magnetic drives 312 and/or a RAID array of SSDs 308. The magnetic drives 312 are spinning hard drives of a 1.8, 2.5 or 3.5 inch configuration with a SATA, SAS, PATA, SCSI, Firewire™, USB 2.0, USB 3.0, Ethernet, Thunderbolt™, PCI express, RAID, or other interface. The SSD 308 could be 1.8 inch, 2.5 inch, 3.5 inch, mini-PCI or PCI configurations with the appropriate interfaces. In some embodiments, the SSD(s) 308 and magnetic drives 312 could be integral to a chassis with other components of the edge server 230 or in a separate rack slice.

A hardware processor 304 is coupled to the storage drives 308, 312 and a network interface 316. The processor 304 choreographs providing storage, hosting and caching on the drives 308, 312 under the command of software. In this embodiment, a cache manager 320 is software in the application layer that customizes the processor 304 to make the edge server 230 a special-purpose computer that is suitable for use in a CDN 110. The cache manager 320 could coexist with other application software to allow the edge server 230 to provide other services and processing, for example, media serving, Flash™ or Silverlight™ serving, DRM, encryption, encoding, other software as a service (SAS) or cloud computing. The other services may also use the drives 308, 312.

There are bottlenecks in this exemplary edge server architecture. The interface to the drives are bandwidth limited by either the interface itself and/or the drive 308, 312 on the interface along with the throughput of the network interface 316. Any bottleneck between the storage and the Internet 104 caps the maximum data flow out of the edge server 230. Magnetic drives 312 are inexpensive storage, but have poor seek times due to the drive head having to move to the data location on the spinning drive to read information. As the number of simultaneous data requests are serviced by the magnetic drives 312, the seek times can be the biggest bottleneck reducing the aggregate data flow from the drives 312. SSDs 308 have better random access times with very little seek time to allow servicing a larger number of simultaneous request with little degradation. SSD 308 suffer from a limited number of writes to each cell of flash memory. The bottleneck of the network interface 316 and processing power is solved by having many edge servers 230 acting in parallel to divide up the load on the POP 120.

The cache manager 320 maintains content scoring 324 for the content objects requested from the edge server 230. Where a new content object is requested for the first time, a score is assigned using available information such as size and popularity of other content from the same content originator, path, file format, encoding, etc. The content scoring 324 changes over time as popularity is assessed. Popularity may have a periodicity associated with it, for example, movie content objects are more likely to be viewed in prime time and on Saturday than other times of day or week. Considering popularity hourly could result in the movie being written to the cache during prime time each night only to be flushed daily.

Another dimension to the cache manager 320 deciding which type of drive to use in caching or hosting a content object is how the drive operates, i.e., a drive model 328. Different drive architectures and technologies have different advantages and disadvantages. The drive model 328 appreciates the cost per byte of storage, the interface bandwidth and when it degrades from saturation, the average seek times as well as how seek time degrades with the number of simultaneous requests being serviced, the impact of writing on the life of the drive, the degradation curve as more reads and/or writes occur simultaneously.

A new type of drive added to the edge server 230 would cause a new drive model 328 to be available to the cache manager 320. These drive models 328 could be loaded externally from off-line analysis and/or could be devised from historical performance. For example, a drive model 328 generally applicable to a new SSD 308 could be used, but it would be updated as the drive degrades over time with drives nearing likely failure because of excessive writing being used infrequently for tasks that would result in additional writes. In a real-world scenario, a SSD 308 might initially be used for caching, but transitioned to hosting as it nears end of life.

Another factor tracked by the drive model 328 is the degradation in throughput of a SSD 308 as it is over utilized. SSDs 308 perform background housekeeping functions to even out wear level and more compactly utilize blocks of flash memory. Under constant loading, the amount of housekeeping increases, which limits the amount of storage operations that can also be serviced. The cache manager 320 can estimate the amount of housekeeping functions being performed by monitoring performance and throttle back storage operations for a particular SSD 308 in favor of other SSds 308 or magnetic drives 312 so as to not saturate the internal processing of the SSD 308 in a way that would curtail storage operations. In a simple example, the cache manager 320 could take a SSD 308 offline for a period of time each day.

As a magnetic drive 312 degrades, the treatment by the cache manager 320 could be very different based upon the drive model 328. Magnetic drives 312 have sectors that start failing and as that happens, the drive 312 may read and re-read that sector to help reliably predict the contents. As sectors start going bad and read times increase, less popular content might be stored on that magnetic drive 312 while magnetic drives 312 with less wear would receive more popular content that is stored on magnetic drives 312.

Additionally, certain classes of information need more reliable storage, which is appreciated by the cache manager 320. Hosted content may not have any backup copy. Cached content always has a backup on an origin server. Where there is no backup, a drive model 328 for the most reliable storage would be used. For example, a magnetic drive 312 that is beyond infant mortality, but not so worn as to result in likely errors could be favored for content that is hosted without any backup.

Deciding what to store where is performed by the cache manager 320. Servicing content requests is performed by a content serving function 332. The various SSD 308 and magnetic drives 312 are referenced to find a content object by the content serving function 332. Where not found, a storage array 234 or origin server 112 is referenced to find the content object. The cache manager 320 may decide to store in its edge server 230 a content object that was requested, but not found locally. Once the content serving function 332 finds the content object, it is returned to the end user 128 through the network interface 316.

Figure 4A:
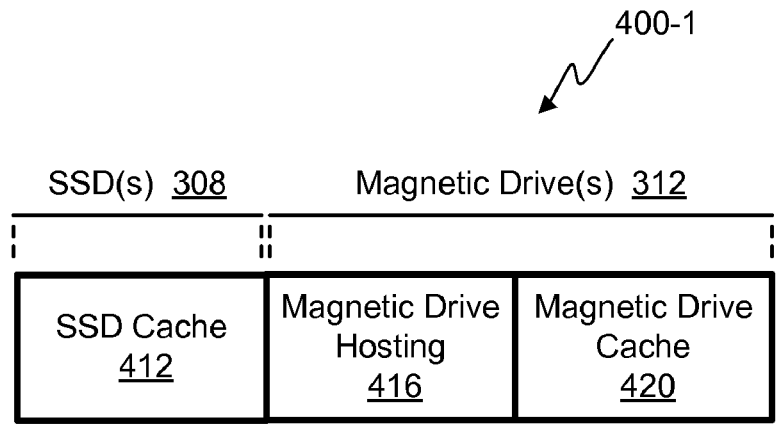
FIGS. 4A, 4B, 4C & 4D illustrate diagrams of embodiments of a storage architecture for a CDN.

With reference to FIG. 4A, a diagram of an embodiment of a storage architecture 400-1 for a CDN 110 is shown. The storage architecture 400-1 is maintained by the cache manager 320 and has multiple segments shown from left to right with the higher QoS generally being on the left and the lower QoS being on the right. There is correspondingly greater expense storing on the left-most segments with respect to the right-most segments. In this embodiment, the cache manager 320 oversees SSD caching 412, magnetic drive hosting 416 and magnetic drive caching 420. Hosting of content provides better QoS because there are no cache misses to contend with, but may store content that is very infrequently requested.

For the most frequently requested content, it is likely to appear in the SSD or magnetic drive caches 412, 420 unless being hosted 416. A scoring system is used to decide what to store in the SSD or magnetic drive caches 412, 420. Traditional cache algorithms don't appreciate application layer information that is available to the cache manager 320. Writes to the SSD 308 are costly in the sense that they cause wear to the flash memory cells and additionally consume interface bandwidth to contribute to the bottleneck interfacing with drives 308, 312. The cache manager 320 could gather a plurality of content objects to be stored into the SSD cache 412 in other memory, e.g., RAM, and write from the other memory into the SSD cache 412 once the plurality of content objects in the other memory meets or exceeds a predetermined amount of data.

The size of the caches 412, 420 provide additional constraint to the cache manager 320 in deciding what to cache where. Very large objects like high-definition movies could quickly saturate a particular SSD 308 and quickly churn many writes. For example, a 250 GB SSD 308 could store around fifteen different HD movies at the same time from a library of thousands. If the single SSD 308 was the only cache, the top fifteen movies would constantly be changing resulting in many different movies being written to the SSD 308. The cache manager 320 could score small content objects (relative to the size of the SSD 308) and popular content objects in the SSD cache 412 and place others in the magnetic drive cache 420. The content scoring 324 is considered in deciding between the SSD and magnetic drive caches 412, 420.

The cache manager 320 considers the aggregate effect of writing to the SSD 308 against the number of content objects that can be stored in the SSD 308 by referring to the drive model 328. Storage on the SSD 308 results in much higher QoS to the end users 128 as those content objects are sourced much more quickly on average as the POP 120 becomes heavily loaded. It is difficult for the cache manager 320 to predict future requests for content objects. Using past requests as a guide, the cache manager 320 makes educated guesses that are stored as content scoring 324.

For a new content object where the popularity is unknown, but size and popularity of similar content objects (e.g., similar encoding, size, format, file name or the same path content originator) are known through reference to originator profiles 336, an initial guess of popularity could be used for the scoring with adjustment after further interaction. Originator profiles 336 include popularity curves for all content and/or defined groups of content. For example, there could be an originator profile 336 for the ACME-video-news.com domain for *.mov files that indicates that the new *.mov files are very popular for one day until the news cycle has moved on. A new *.mov file would be presumed to be as popular as those previously loaded from the ACME-video-news.com domain. The originator profile 336 could also give initial predictions of how soon content will change. Quickly changing content might not be a good candidate for SSD 308 as writing and replacing information will be frequent.

Another factor stored in the originator profile 336 is the request periodicity. For example, a restaurant serving breakfast may be very popular each morning, but not popular in other times during the day. Traditional caching algorithms without access to application layer information would push out that content each day only to have it requested again each day. Integrating popularity over a day period will keep the content in the cache, but an hour period would push out the content. Another example of a site showing weather alerts might have a four hour period because old weather alerts are very infrequently referenced. The originator profiles 336 can be for an entire domain, certain directories, or categories of content defined in any number ways. For example, small *.gif files for a particular domain may remain popular for a month at a time as the *.gif file corresponds to a monthly calendar icon on the web page such that a month long integration time for determining popularity would be appropriate.

Where a new content object is encountered, some embodiments will query to other edge servers 230 in the current POP 120, or other POPs 120 if there is no scoring found in the current POP 120. Some embodiments treat the content scoring 324 as a distributed database that is automatically reconciled throughout the CDN 110. Other embodiments could reconcile missing scoring, but could favor regional scoring to appreciate what could be geographic preference for a particular content object.

The magnetic drives 312 both host 416 and cache 420 content. Magnetic drive hosting 416 is an option available to the content originators 106. Hosted information is divided among the edge servers 230 in each POP 120 and stored on the magnetic drive(s) 312. The magnetic drives 312 also hold a magnetic drive cache 420. Items too large or infrequently requested or otherwise having low content scoring 324 are stored in the magnetic drive cache 420 instead of the SSD cache 412. If the content scoring 324 is very low, it is likely that the content object will be aged out of the cache until requested again.

Customers can override the cache algorithm that decides between the SSD cache 412 and the magnetic drive cache 420 through an appropriate policy in some embodiments. The policy could specify one option from the several without exception or could specify the circumstances to choose from the options. For example, a customer could specify a policy that only used spinning media for storage and caching except for a logo that would only be stored in SSD 308. Costing models are developed to charge according to the customizations available in the storage policy.

Figure 4B:
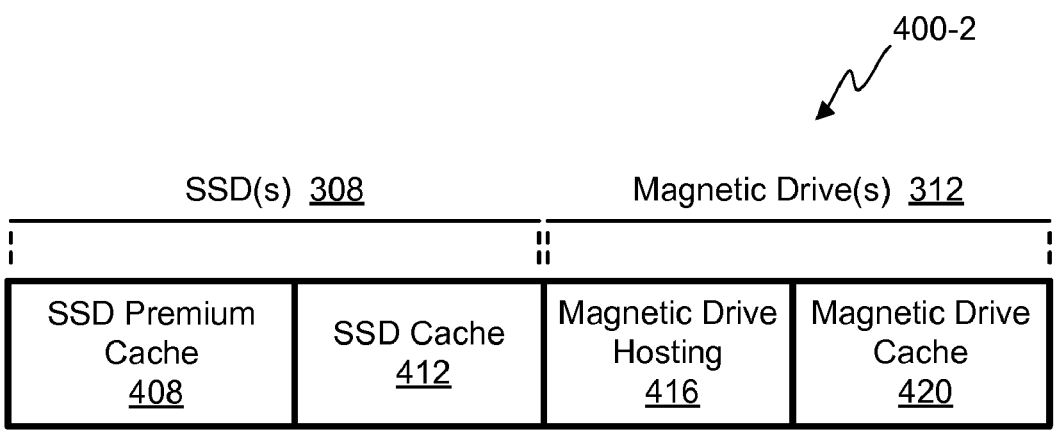

Referring next to FIG. 4B, a diagram of another embodiment of a storage architecture 400-2 for a CDN 110 is shown. This embodiment includes a SSD premium cache 408 that is favored over the SSD cache 412. Customers can select to add SSD caching for some or all of their content in the SSD 308. Some of the SSD 308 is reserved for the SSD premium cache 408. Remaining capacity of the SSD 308 is used as a SSD cache 412 for content not designated for the SSD premium cache 408. Some embodiments only have SSD premium cache 408 on the SSD 308 without other caching.

Figure 4C:
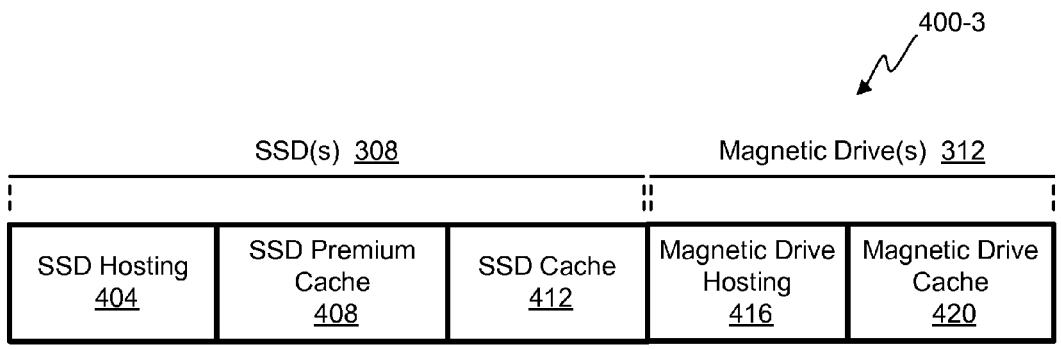

With reference to FIG. 4C, a diagram of yet another embodiment of a storage architecture 400-3 for a CDN 110 is shown. This embodiment varies from the embodiment of FIG. 4B in that a portion of the SSD 308 is used to host certain content designated by content originators 106. The hosted content is stored in the SSD hosting 404 irrespective of content scoring in this embodiment. The content originator 106 can force SSD storage on the SSD 308.

Some embodiments allow the content originator 106 to specify content for hosting, but leave it to the cache manager 320 to decide between SSD 308 and magnetic drive 312 for that storage. The content scoring 324 is used along with drive models 328 to decide between the SSD 308 and magnetic drive 312 much in the way that the cache manager 320 decides between SSD cache 412 and magnetic drive cache 420.

Figure 4D:
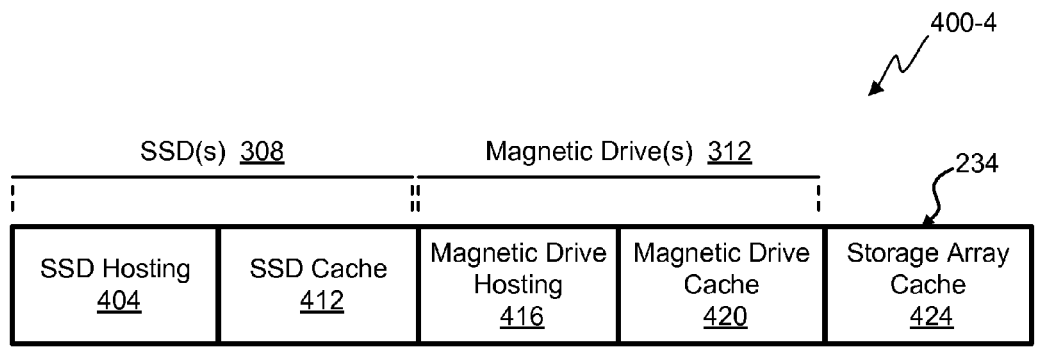

Referring next to FIG. 4D, a diagram of still another embodiment of a storage architecture 400-4 for a CDN 110 is shown. This embodiment has both SSD hosting 404 and SSD caching 412 on the SSD 308. The magnetic drive(s) 312 has magnetic drive hosting 416 and magnetic drive caching 420. Additionally, a storage array cache 424 in the storage array 234 in the POP 120 can be used for hosting and caching under the control of the cache manager. Moving storage away from the edge generally increases latency, but prevents having to go to an origin server 112, 248 to retrieve missing content. In some cases, the edge may actually be slower than storage in a server elsewhere in the POP 120 or CDN 110.

Figure 5:
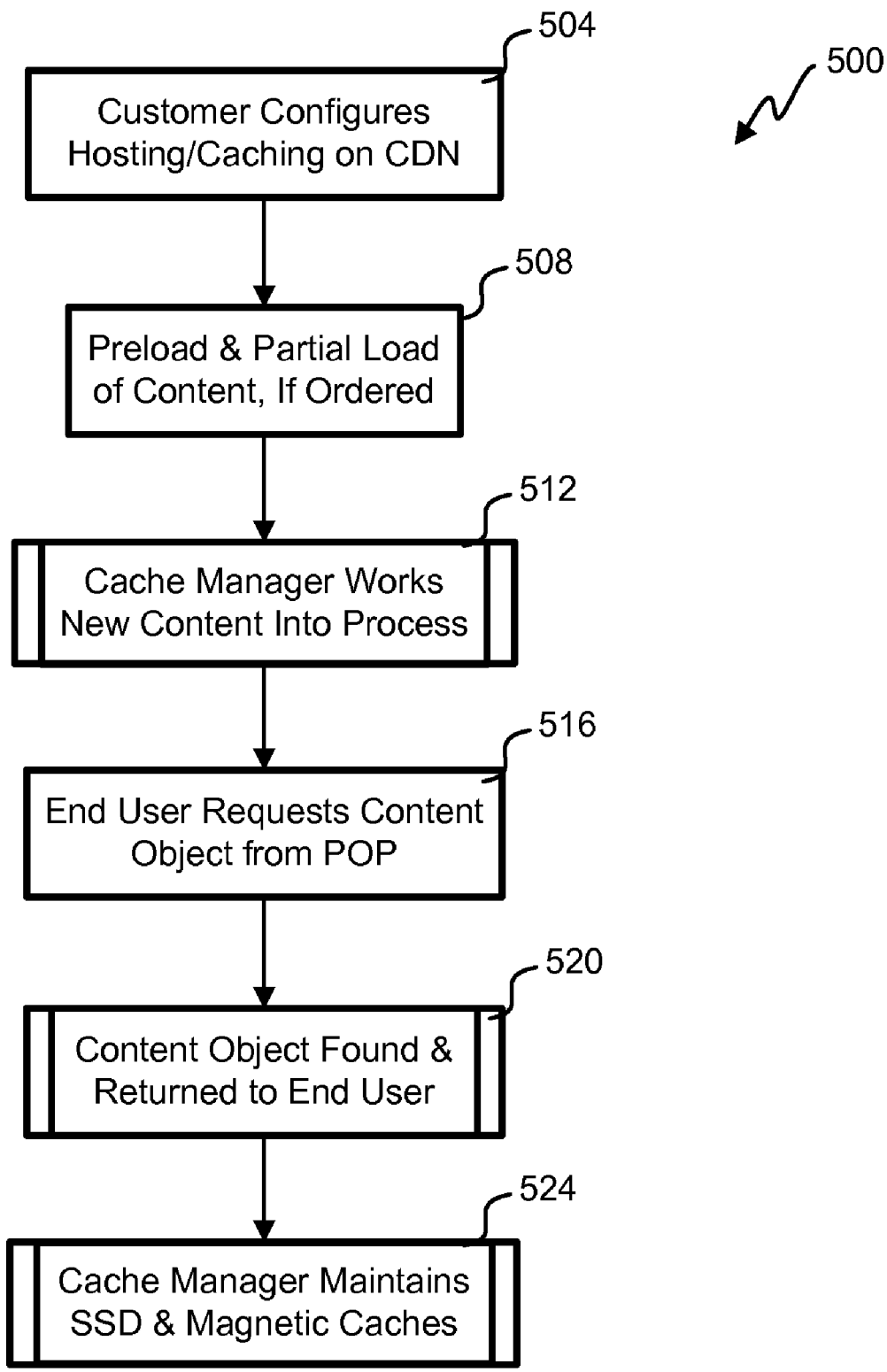
FIG. 5 illustrates a flowchart of an embodiment of a process for distributing content with a CDN.

With reference to FIG. 5, a flowchart of an embodiment of a process 500 for distributing content with a CDN 110 is shown. The depicted portion of the process 500 begins in block 504 where the content originator 106 or customer configures hosting and/or caching with the CDN 110. The customer can select hosting and/or caching. Premium hosting and/or caching can be selected by the customer to use SSD 308. The selection can be for individual content objects or for groups of content objects. Groups can be designated by path, domain, size, score, format, encoding, or any other way to designate a group. For example, a customer can specify SSD hosting for content objects having a score above a first threshold and SSD caching above a second threshold. For content objects below the second threshold, magnetic drives 312 are used for storage.

Depending on the options selected, preloading or partial loading is performed for content objects at block 508. Hosted content objects are loaded in the CDN origin server 248 and possibly in POP storage arrays 234 and edge servers 230. Some embodiments allow partially loading content into hosts and caches. For example, a predetermined time segment or size of a segment can be loaded so that the content object can start playing quickly while the remainder is gathered from higher latency sources. Important portions of a content object are determined in any number of ways such that those portions can be hosted or pre-populated into caches. For example, the first few seconds of a video could be stored in SSD 308 for quick access while the remainder is found in magnetic drives 312. In another example, the frames used while fast forwarding or rewinding a streamed video could be hosted or cached in SSD 308 while the actual playback would be from magnetic drives 312. A storage policy could be defined for certain video codecs that periodically store complete frames with delta frames stored in-between. The complete frames are used for fluid fast forwarding and other things such that SSD 308 could be specified in the policy for the complete frames.

In another example, a popular large file could be handled differently through a properly designed policy. Where a large file is heavily requested, the interface to the SSD 308 or magnetic drive 312 or the network interface(s) could be overwhelmed by the flow of data. The popular large file could be divided among several drives 308, 312 to spread out that load in a manageable way. An automated algorithm could determine how many segments to divide the content object into based upon its size and/or popularity.

pen in parallel to the serving of content by the content serving function 332 in blocks 516 and 520 and the housekeeping by the cache manager 320 in block 524.

Figure 6:
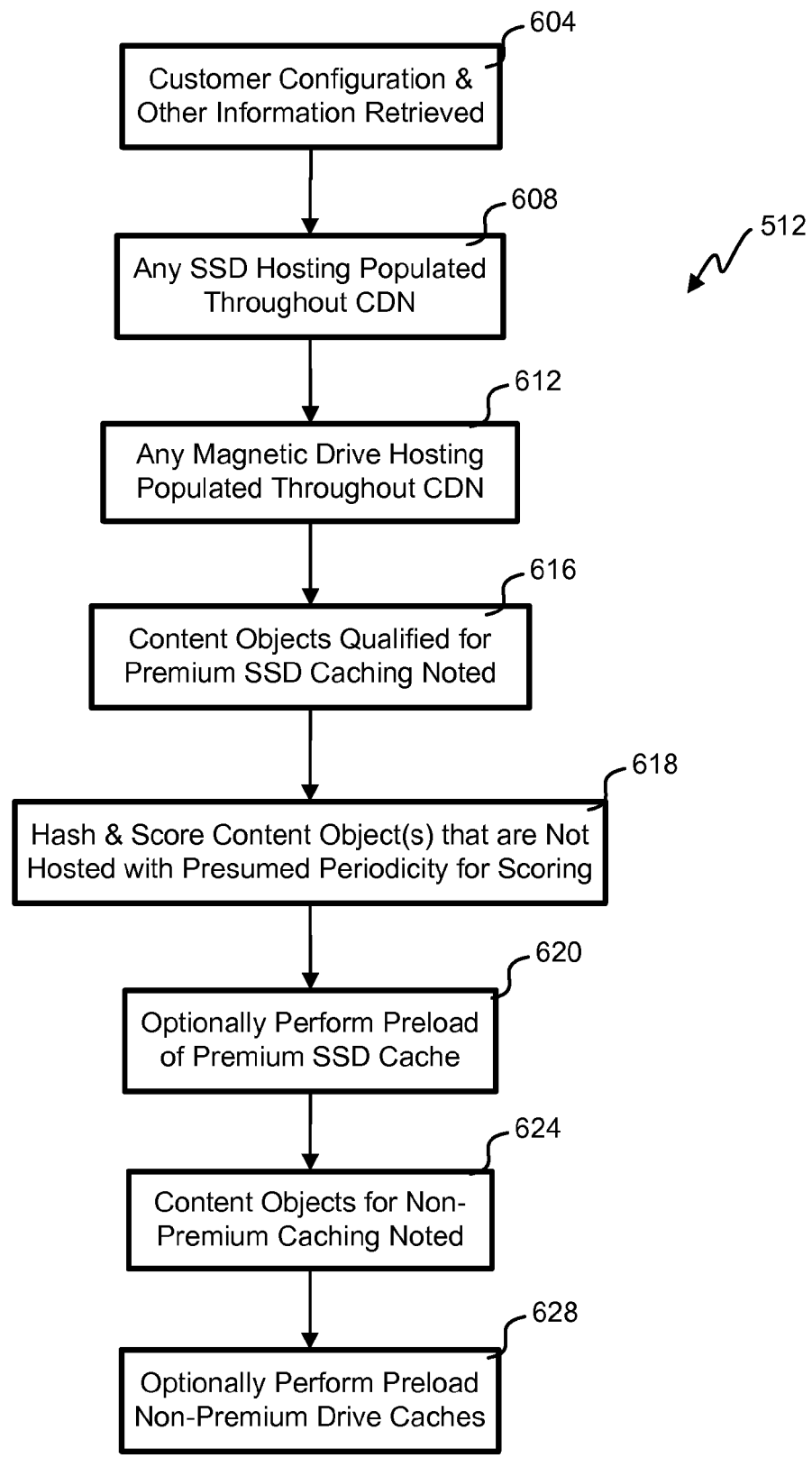
FIG. 6 illustrates a flowchart of an embodiment of a process for ingesting new content into the CDN.

Referring next to FIG. 6, a flowchart of an embodiment of a process 512 for ingesting new content into the CDN 110 is shown. This ingest process 512 corresponds to block 512 of FIG. 5. In bock 604, the customer configuration is retrieved to know hosting and caching options. Various embodiments support specifying SSD 308 or magnetic drive 312 caching and/or hosting on individual content objects or groups of content objects. In block 608, the SSD hosting is populated through to the SSDs 308 of the edge servers 230 in the various POPs 120. Where only hosting is specified without the SSD option, the content is propagated to magnetic drives 312 in the various edge servers 230 in the various POPs 120. Hosting may be staged into a hierarchy where the CDN origin server 248, the POP storage array 234, the magnetic drive 312 in an edge server 230, and the SSD 308 in an edge server 230 are utilized as content becomes increasingly requested.

In block 616, content objects that are specified by the customer for SSD premium caching 412 are determined and the appropriate edge servers 230 are notified so that a subsequent request will load the content object into the SSD cache 412. Cached content is scored in block 618 with periodicity for integration of the popularity initially presumed along with other factors such as the popularity curve from information stored in the originator profiles 336. The Table shows an example of a portion of the content scoring 324.

| Table Cache Management of Content Objects | | | | | | |
|---|---|---|---|---|---|---|
| Content Object URL | Segment | Hash | Time to Live | Size | Popularity | Score |
| ...\foo.jpg | All | A8796B892F64h | Hosted | 3 KB | 2 | 1000 |
| ...\sportclip.bmp | All | 8797FE9809A6h | 15,982,433 s | 5 KB | 1 | 999 |
| ...\car.jpg | All | 890DC80324A4h | 13,389,123 s | 6 KB | 7 | 994 |
| ...\ACME_Logo.gif | All | D9083CF47652h | Hosted | 9 KB | 3 | 993 |
| ...\lottery.htm | All | 8742FE098A0Bh | 12,795,123 s | 9 KB | 4 | 980 |
| ...\scandal.htm | All | 0238F08E0A09h | 10,342,123 s | 12 KB | 5 | 975 |
| ...\thumbnail.tif | All | 083210E23D43h | 9,324,412 s | 13 KB | 16 | 913 |
| ...\Cert_Seal.gif | All | 08231EA8C890h | 8,123,121 s | 15 KB | 30 estimate | 913 |
| ...\HD_movie.mpeg | 1$^{st}$ 10 MB | 08ADE009408h | 4,093 s | 14 GB | 50 | 889 |
| ... | ... | ... | ... | ... | ... | ... |
| ...\HD_movie.mpeg | Remainder | 9803DE08A08Ah | 4,093 s | 14 GB | 996 | 17 |
| ...\sw_update.zip | All | 98038F808E08Ah | Hosted | 16 GB | 998 | 14 |
| ..\Ext_Series.mpg | All | 8904842F2D23Eh | 123 s | 19 GB | 999 | 13 |

In block 512, the cache manager 320 works new content into the process by scoring the content and determining which of the multiple storage options to use for a particular content object. For some content this will include loading content and for others it simply means that the edge servers 230 are informed to load the content object if ever requested at which point, the cache manager 320 will decide where to store the content from the several options. At some point after the content originator 106 becomes a customer of the CDN 110, end users 128 will start requesting the content object in block 516.

In block 520, the requested content object is returned to the end user 128 from the POP 120. Periodically, the cache manager 320 performs housekeeping functions in block 524 to update the drive models 328, originator profiles 336, and content scoring 324. Additionally, content could be moved around between the various hosting and caching options on the different physical hardware. Although shown as a series of blocks, the customer intake in blocks 504, 508 and 512 hap- Small and popular content objects are scored high while large and unpopular content is scored low in this embodiment. New content may have an estimated popularity inferred from the originator profile 336 developed for similar content. Cached content has a time to live value defined by the origin server when the file is requested that serves as an indication of when the content object can no longer be presumed to be unchanged. After the time to live, the content object is normally removed from the cache. This embodiment checks that the hash value for the content has changed before removal to avoid unnecessary writes. The hash value is a number that is unique to a particular content object and typically calculated as a one-way encryption function, for example SHA-256. Hosted content has no time to live as newer versions are simply stored on the CDN when updated.

In the Table, there is a content object . . . \Cert_Seal.gif that has an estimated score of thirty. The estimated score was based upon some inference and can serve as an initial guess that changes as real data is gathered. The inference could be that similar content files in location, domain, size, zone, and/or encoding had scores that were inferred to . . . \Cert_Seal.gif since it was similarly situated.

Another example in the Table involves a content object that is split and scored separately. A small initial portion of 10 MB for . . . \HD_movie.mpeg is scored highly for a video content object. The remainder of . . . \HD_movie.mpeg has a low score. The initial portion could be stored on SSD 308 and played with little latency while the remainder is retrieved more slowly, for example.

Some embodiments allow pre-population of the SSD premium cache 408 in block 620, which can be specified in a storage policy. For example, a content originator may have just updated their logo image and know that it will be popular so they would select it for pre-population in the SSD premium cache 408. Content objects or groups of content objects that can be cached by the CDN 110 are specified to the edge servers 230 in block 624. For example, a customer may specify that all request for content from an ACME.llnw.com domain would be cached relying on an origin server at ACME.com. Pre-population of the non-premium caches 412, 420, 424 in the hierarchy is performed in block 628 based upon initial scoring. For example, a high scored content object would be pre-populated into the SSD cache 412, but a low scored would be populated into a storage array cache 424.

Figure 7:
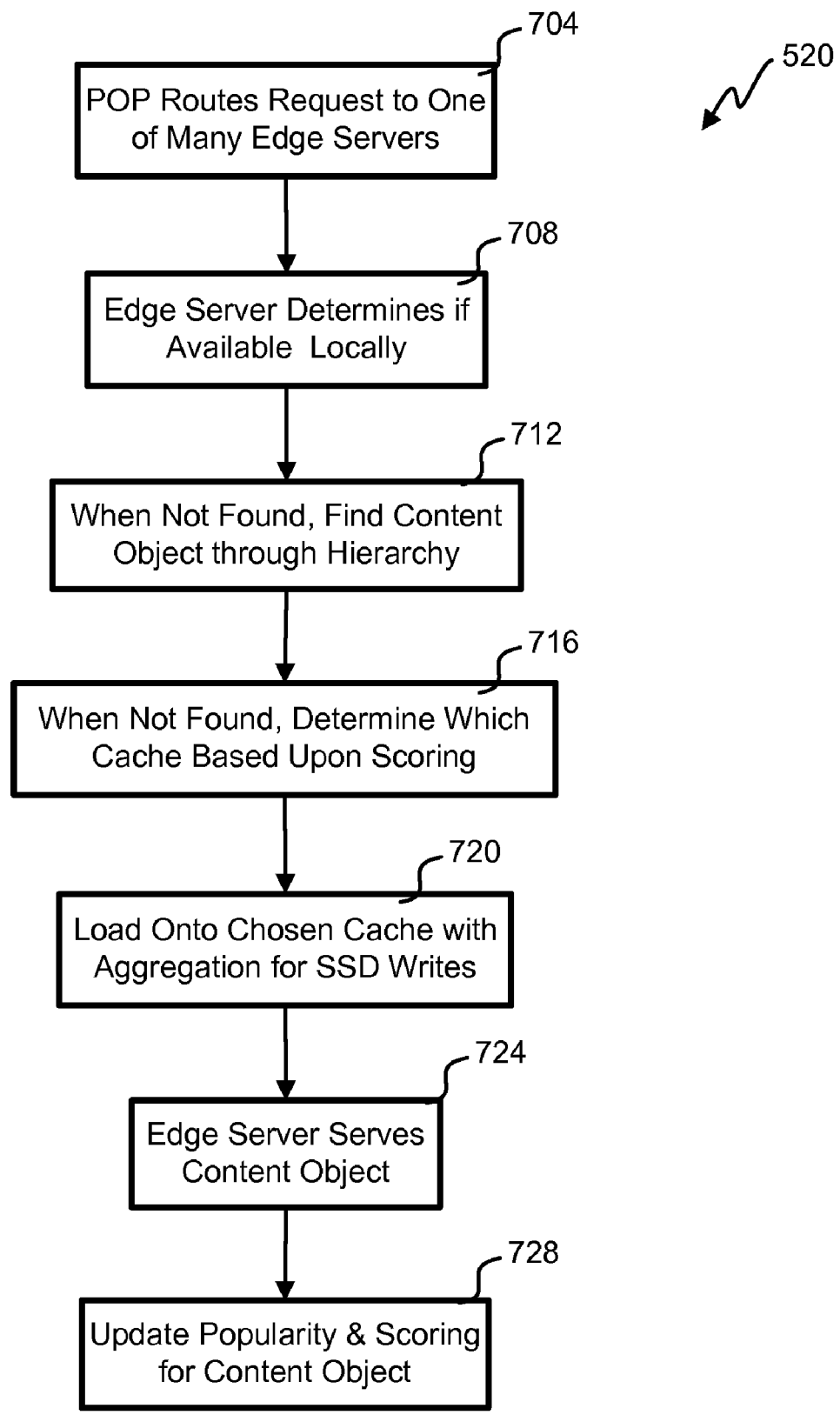
FIG. 7 illustrates a flowchart of an embodiment of a process for serving content to an end user.

With reference to FIG. 7, a flowchart of an embodiment of a process 520 for serving content to an end user 128 is shown. The serving process 520 corresponds to block 520 in FIG. 5. The depicted portion of the process begins in block 704 where a request for content has been routed to a POP 120 which further routes the request using the switch fabric 240 to an edge server 230. In block 708, the edge server determines if the content object is stored local to the edge server 230 somewhere in the SSD 308 or magnetic drive 312. It may be the case that only a portion is stored locally which would be served while the remainder is found. In any event, the entire content object or missing portions are found in block 712, by referring to other edge servers 230 in the POP 120, the storage array 234, other POPs 120, a CDN origin server 248 or a content originator origin server 112.

Based upon the content scoring 324, the found content object is slotted into appropriate cache in block 716. Using the example in the Table, scores above 900 may be stored in the SSD cache 412 and scores below 100 stored in the storage array cache 424 with everything else stored in the magnetic drive cache 420. These thresholds can be moved around based upon the drive models, specifically, the relative sizes for each different type storage. Some embodiments can track the number of SSD writes per request as a figure of merit to determine scoring based upon the configuration of a particular edge server 230. If the ratio is low such that there are few writes for a large number of requests relative to other content objects, the content file is a good candidate for the SSD cache 412. The content object is written into the appropriate cache in block 720.

From the chosen cache, the content object is sourced in block 724. Spooling out from the cache can happen simultaneously to spooling into the cache such that the end user 128 need not wait for a complete load before receiving the initial portion of the content object. In block 728, the content scoring 324 is updated to reflect another request for the content object.

Figure 8:
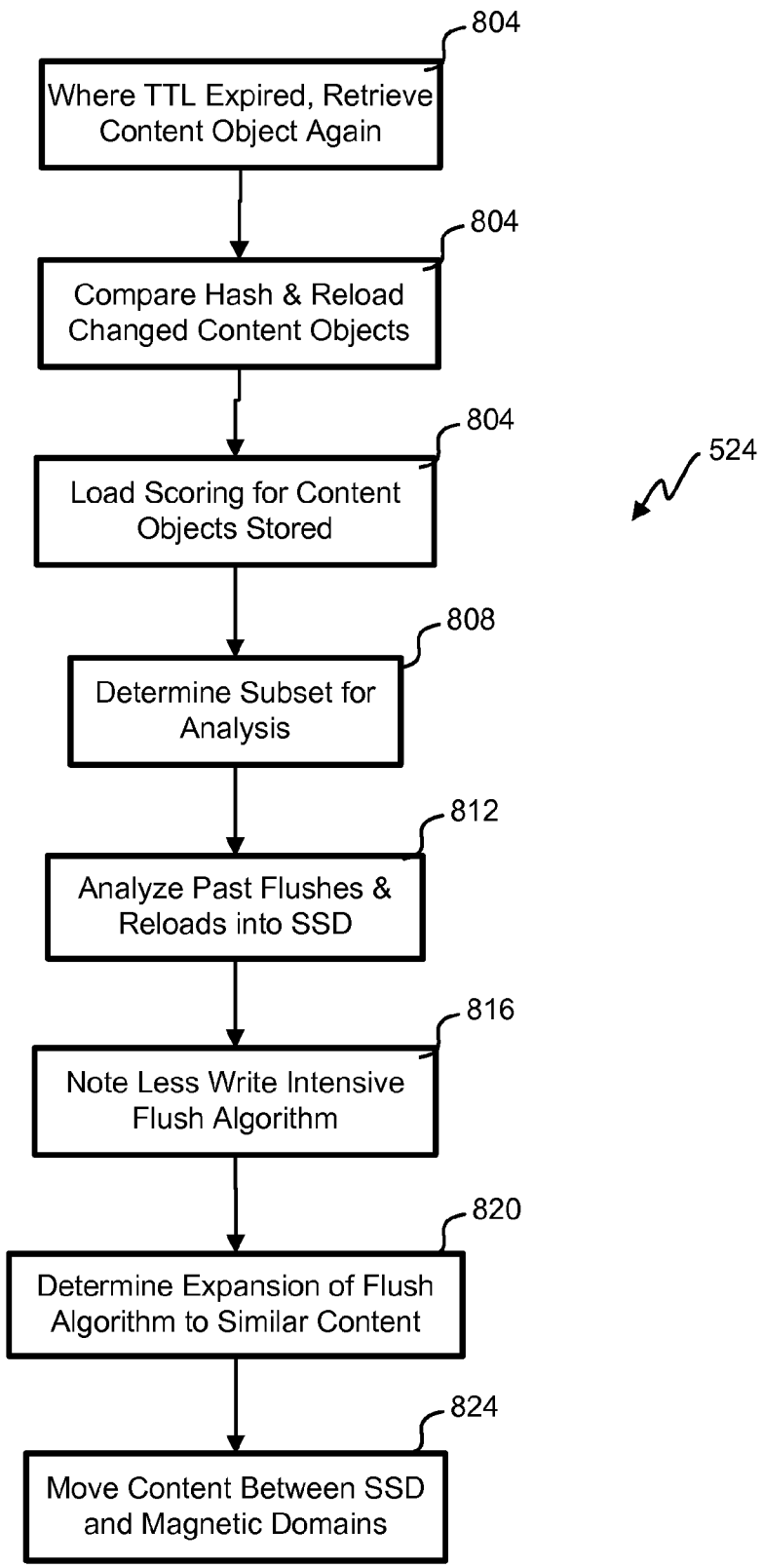
FIG. 8 illustrates a flowchart of an embodiment of a process for maintaining balance between the SSD and magnetic caches.

Referring next to FIG. 8, a flowchart of an embodiment of a housekeeping process 524 for maintaining balance between the various caches is shown. The housekeeping process 524 corresponds to block 524 in FIG. 5. The depicted portion of the process begins in block 804 where the content scoring 324 is loaded. Only a subset of the content as determined in block 808 is analyzed at a given time. Past flushes and reloads into the SSD 308 are good candidates for analysis. In block 812, content objects that are reloaded into the SSD cache 412 often are scrutinized to determine if the period over which popularity is determined were increased would the ratio of writes per request decrease. If that is the case, the period of analysis is changed in the originator profile 336 in block 816.

Inferences to other similar content objects could be drawn in block 820. The inference could be simply an average of this analysis, for example, for large *.jpg files in a given path, the analysis finding a day periodicity works for most of the content objects could lead to a general presumption to use the day period for all new *.jpg files in that path. According to the new scoring, content is moved between the various caches 412, 420, 424 in block 824.

Figure 9:
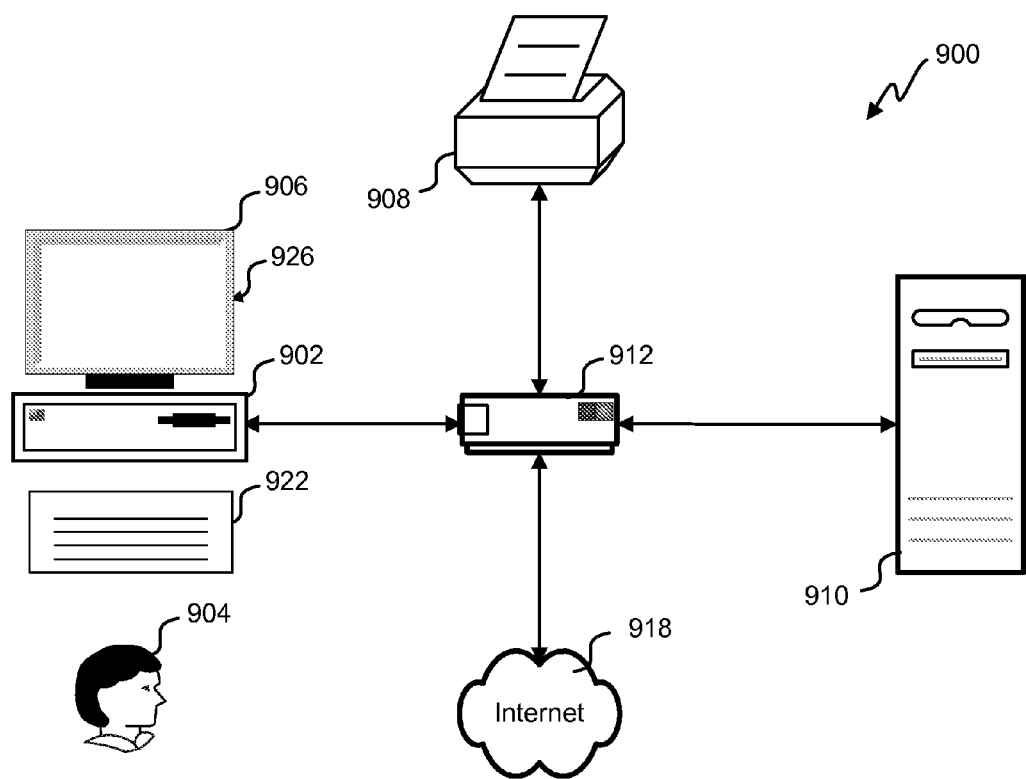
FIG. 9 depicts a block diagram of an embodiment of a computer system.

Referring next to FIG. 9, an exemplary environment with which embodiments may be implemented is shown with a computer system 900 that can be used by a designer 904 to design, for example, electronic designs. The computer system 900 can include a computer 902, keyboard 922, a network router 912, a printer 908, and a monitor 906. The monitor 906, processor 902 and keyboard 922 are part of a computer system 926, which can be a laptop computer, desktop computer, handheld computer, mainframe computer, etc. The monitor 906 can be a CRT, flat screen, etc.

A designer 904 can input commands into the computer 902 using various input devices, such as a mouse, keyboard 922, track ball, touch screen, etc. If the computer system 900 comprises a mainframe, a designer 904 can access the computer 902 using, for example, a terminal or terminal interface. Additionally, the computer system 926 may be connected to a printer 908 and a server 910 using a network router 912, which may connect to the Internet 918 or a WAN.

The server 910 may, for example, be used to store additional software programs and data. In one embodiment, software implementing the systems and methods described herein can be stored on a storage medium in the server 910. Thus, the software can be run from the storage medium in the server 910. In another embodiment, software implementing the systems and methods described herein can be stored on a storage medium in the computer 902. Thus, the software can be run from the storage medium in the computer system 926. Therefore, in this embodiment, the software can be used whether or not computer 902 is connected to network router 912. Printer 908 may be connected directly to computer 902, in which case, the computer system 926 can print whether or not it is connected to network router 912.

Figure 10:
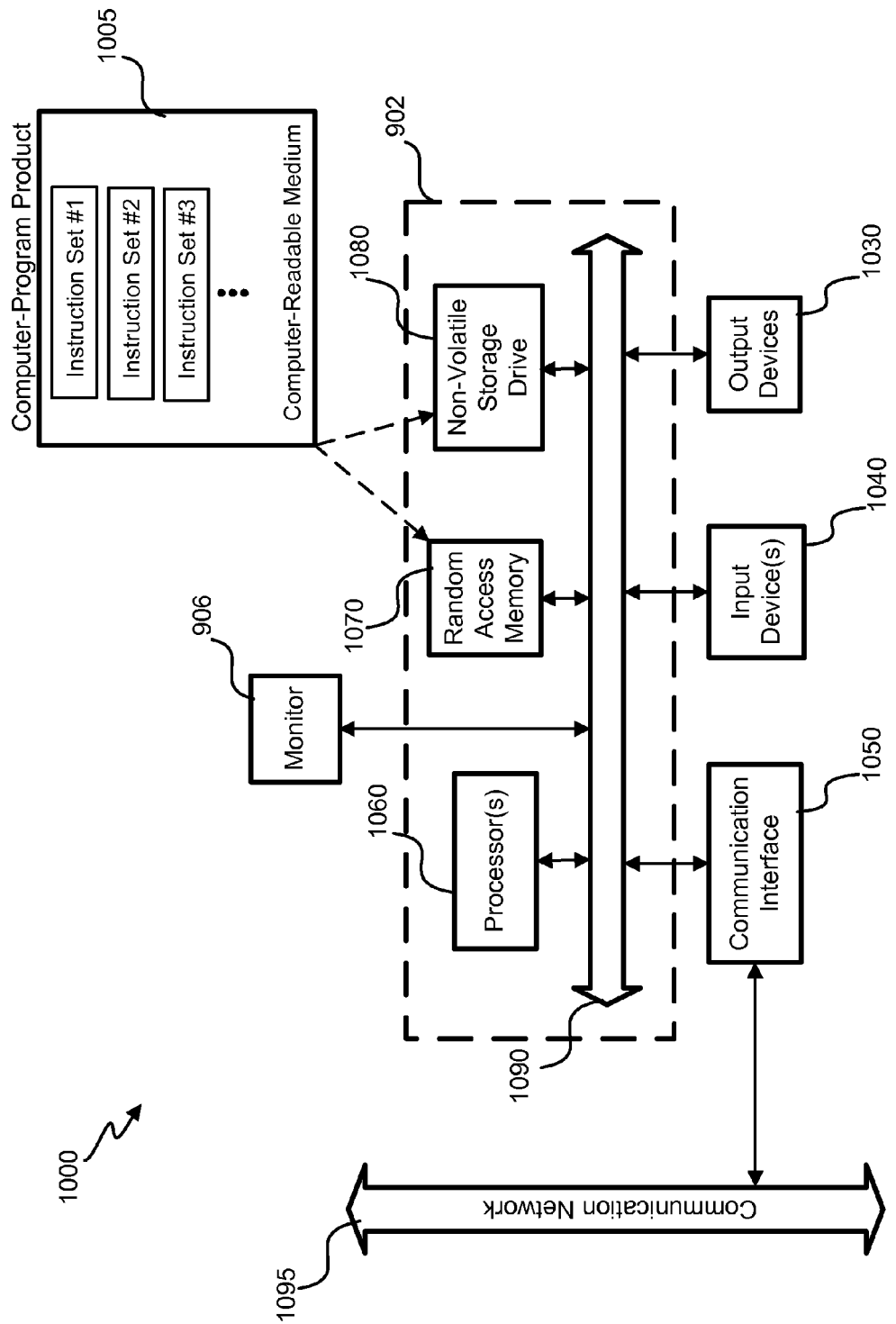
FIG. 10 depicts a block diagram of an embodiment of a special-purpose computer system.

With reference to FIG. 10, an embodiment of a special-purpose computer system 1000 is shown. The enterprise platform 104 is one example of a special-purpose computer system 1000. The third-party ad creation tool 108 may run on the enterprise platform 104 or another special-purpose computer system. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 926, it is transformed into the special-purpose computer system 1000.

Special-purpose computer system 1000 comprises a computer 902, a monitor 906 coupled to computer 902, one or more additional user output devices 1030 (optional) coupled to computer 902, one or more user input devices 1040 (e.g., keyboard, mouse, track ball, touch screen) coupled to computer 902, an optional communications interface 1050 coupled to computer 902, a computer-program product 1005 stored in a tangible computer-readable memory in computer 902. Computer-program product 1005 directs system 1000 to perform the above-described methods. Computer 902 may include one or more processors 1060 that communicate with a number of peripheral devices via a bus subsystem 1090. These peripheral devices may include user output device(s) 1030, user input device(s) 1040, communications interface 1050, and a storage subsystem, such as random access memory (RAM) 1070 and non-volatile storage drive 1080 (e.g., disk drive, optical drive, solid state drive), which are forms of tangible computer-readable memory.

Computer-program product 1005 may be stored in non-volatile storage drive 1080 or another computer-readable medium accessible to computer 902 and loaded into memory 1070. Each processor 1060 may comprise a microprocessor, such as a microprocessor from Intel® or Advanced Micro Devices, Inc.®, or the like. To support computer-program product 1005, the computer 902 runs an operating system that handles the communications of product 1005 with the above-noted components, as well as the communications between the above-noted components in support of the computer-program product 1005. Exemplary operating systems include Windows® or the like from Microsoft Corporation, Solaris® from Sun Microsystems, LINUX, UNIX, and the like.

User input devices 1040 include all possible types of devices and mechanisms to input information to computer system 902. These may include a keyboard, a keypad, a mouse, a scanner, a digital drawing pad, a touch screen incorporated into the display, audio input devices such as voice recognition systems, microphones, and other types of input devices. In various embodiments, user input devices 1040 are typically embodied as a computer mouse, a trackball, a track pad, a joystick, wireless remote, a drawing tablet, a voice command system. User input devices 1040 typically allow a user to select objects, icons, text and the like that appear on the monitor 906 via a command such as a click of a button or the like. User output devices 1030 include all possible types of devices and mechanisms to output information from computer 902. These may include a display (e.g., monitor 906), printers, non-visual displays such as audio output devices, etc.

Communications interface 1050 provides an interface to other communication networks and devices and may serve as an interface to receive data from and transmit data to other systems, WANs and/or the Internet 918. Embodiments of communications interface 1050 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1050 may be coupled to a computer network, to a FireWire® bus, or the like. In other embodiments, communications interface 1050 may be physically integrated on the motherboard of computer 902, and/or may be a software program, or the like.

RAM 1070 and non-volatile storage drive 1080 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1070 and non-volatile storage drive 1080 may be configured to store the basic programming and data constructs that provide the functionality of various embodiments of the present invention, as described above.

Software instruction sets that provide the functionality of the present invention may be stored in RAM 1070 and non-volatile storage drive 1080. These instruction sets or code may be executed by the processor(s) 1060. RAM 1070 and non-volatile storage drive 1080 may also provide a repository to store data and data structures used in accordance with the present invention. RAM 1070 and non-volatile storage drive 1080 may include a number of memories including a main random access memory (RAM) to store of instructions and data during program execution and a read-only memory (ROM) in which fixed instructions are stored. RAM 1070 and non-volatile storage drive 1080 may include a file storage subsystem providing persistent (non-volatile) storage of program and/or data files. RAM 1070 and non-volatile storage drive 1080 may also include removable storage systems, such as removable flash memory.

Bus subsystem 1090 provides a mechanism to allow the various components and subsystems of computer 902 communicate with each other as intended. Although bus subsystem 1090 is shown schematically as a single bus, alternative embodiments of the bus subsystem may utilize multiple busses or communication paths within the computer 902.

A number of variations and modifications of the disclosed embodiments can also be used. For example, the above embodiments discuss a magnetic spinning drive, but other embodiments could use tape for the magnetic drive. Additionally, spinning optical storage could used instead of the magnetic drive. Where solid state drive are referenced, solid state storage such as flash memory or magnetic cell memory could be used instead. For example, bulk flash memory could be configured that is randomly accessible without a hard drive interface.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for cache optimization in a hybrid solid state drive and spinning drive cache architecture, the method comprising:
   receiving a content object at a content delivery network (CDN) from a customer for storage, the CDN having a plurality of points of presence (POPs) geographically distributed across the Internet;
   analyzing information related to the content object to determine if storage at one POP of the plurality of POPs will be on a solid state drive (SSD), where the information is from the application layer or above in the open systems interconnection (OSI) model;
   storing the content object on the SSD;
   receiving a request for the content object from an end user at the one POP, where the request corresponds to an universal resource identifier (URI);
   determining that the content object is stored on the SSD rather than a magnetic drive;
   retrieving the content object from the SSD; and
   delivering the content object to the end user.

2. The method as recited in claim 1, wherein the information includes a popularity of the content object with end users measured by the CDN.

3. The method as recited in claim 1, wherein the analyzing scores the content object relative to other content objects.

4. The method as recited in claim 1, further comprising:
   analyzing a plurality of drive models for a plurality of SSD;
   choosing the SSD from the plurality of SSD based, at least in part, on the analysis of the plurality of drive models.

5. The method as recited in claim 1, wherein the information includes a size of the content object and the analysis includes determining that the size is below a predetermined threshold.

6. The method as recited in claim 1, further comprising measuring popularity of the content object over a period of time, wherein the information includes the popularity.

7. The method as recited in claim 1, wherein the storing the content object on the SSD comprises:
   gathering a plurality of content objects into memory; and
   writing from memory to the SSD once the plurality of content objects comprise a predetermined amount of data.

8. The method as recited in claim 1, further comprising:
   hashing the content object;
   determining that a time to live defined for the content object has expired;
   determining that the content object was unchanged through analysis of the hash; and
   leaving the content object in the SSD beyond expiration of the time to live.

9. The method as recited in claim 1, wherein:
   the content object is a subset of a larger content object, and
   a remainder of the larger content object is stored on magnetic media.

10. An edge server of a content delivery network (CDN) having a plurality of points of presence (POPs) geographically distributed across the Internet, the edge server comprising:
    a solid state drive (SSD) that stores a content object;
    a magnetic drive that does not store the content object;
    a network interface that:
       receives a request for the content object from an end user, where the request corresponds to an universal resource identifier (URI), and
       returns the content object from the SSD to the end user; and
    a cache manager operating in the application layer or above in the open systems interconnection (OSI) model, wherein the cache manager:
       loads information related to the content object that is stored by the CDN for a customer;
       analyzes the information to designate the SSD for storage of the content object.

11. The edge server as recited in claim 10, wherein the information includes a popularity of the content object with end users measured by the CDN.

12. The edge server as recited in claim 10, wherein the analyzing scores the content object relative to other content objects.

13. The edge server as recited in claim 10, further comprising:
   analyzing a plurality of drive models for a plurality of SSD;
   choosing the SSD from the plurality of SSD based, at least in part, on the analysis of the plurality of drive models.

14. The edge server as recited in claim 10, wherein the information includes a size of the content object and the analysis includes determining that the size is below a predetermined threshold.

15. The edge server as recited in claim 10, wherein the information includes the popularity of the content object over a period of time.

16. The edge server as recited in claim 10, wherein the SSD is written with batches of content objects after gathered into random access memory (RAM).

17. The edge server as recited in claim 10, wherein the cache manager:
   hashes the content object;
   determines that a time to live defined for the content object has expired;
   determines that the content object was unchanged through analysis of the hash; and
   leaves the content object in the SSD beyond expiration of the time to live.

18. The edge server as recited in claim 10, wherein:
   the content object is a subset of a larger content object, and
   a remainder of the larger content object is stored on the magnetic drive.

19. One or more non-transitory machine-readable medium having machine-executable instructions configured to perform the machine-implementable method for cache optimization in a hybrid solid state drive and spinning drive cache architecture, comprising code for:
   receiving a content object at a content delivery network (CDN) from a customer for storage, the CDN having a plurality of points of presence (POPs) geographically distributed across the Internet;
   analyzing information related to the content object to determine if storage at one POP of the plurality of POPs will be on a solid state drive (SSD), where the information is from the application layer or above in the open systems interconnection (OSI) model;
   storing the content object on the SSD;
   receiving a request for the content object from an end user at the one POP, where the request corresponds to an universal resource identifier (URI);
   determining that the content object is stored on the SSD rather than a magnetic drive;
   retrieving the content object from the SSD; and
   delivering the content object to the end user.

20. The non-transitory one or more machine-readable medium as recited in claim 19, wherein the information includes a popularity of the content object with end users measured by the CDN.

\* \* \* \* \*